(12) United States Patent
Wang et al.

(10) Patent No.: US 12,530,310 B2
(45) Date of Patent: Jan. 20, 2026

(54) DIGITAL OPEN PIN DETECTION

(71) Applicant: Renesas Electronics America Inc., Milpitas, CA (US)

(72) Inventors: Bo Wang, Easton, PA (US); Chun Cheung, Bridgewater, NJ (US)

(73) Assignee: Renesas Electronics America Inc., Milpitas, CA (US)

( * ) Notice: Subject to any disclaimer, the term of this patent is extended or adjusted under 35 U.S.C. 154(b) by 80 days.

(21) Appl. No.: 18/391,980

(22) Filed: Dec. 21, 2023

(65) Prior Publication Data
US 2025/0209030 A1 Jun. 26, 2025

(51) Int. Cl.
*G06F 13/40* (2006.01)
(52) U.S. Cl.
CPC .. *G06F 13/4068* (2013.01); *G06F 2213/0016* (2013.01)
(58) Field of Classification Search
CPC .............. G06F 13/4068; G06F 2213/0016
See application file for complete search history.

(56) References Cited

U.S. PATENT DOCUMENTS

| 11,316,502 | B1* | 4/2022 | Cheung | H03K 3/0372 |
| 2018/0367045 | A1* | 12/2018 | Zhang | H02M 3/33523 |
| 2019/0317132 | A1* | 10/2019 | Ju | G01R 31/58 |
| 2021/0240400 | A1* | 8/2021 | Cumbie | G06F 13/4291 |
| 2022/0065933 | A1* | 3/2022 | Tseng | H02H 7/1216 |
| 2022/0102966 | A1* | 3/2022 | Tan | G01R 31/006 |

* cited by examiner

*Primary Examiner* — Henry Tsai
*Assistant Examiner* — Harry Z Wang
(74) *Attorney, Agent, or Firm* — SCULLY, SCOTT, MURPHY & PRESSER, P.C.

(57) ABSTRACT

Apparatuses, devices, and systems for detecting open pins are described. A controller can control at least one power stage. The controller can include a first set of interface pins, a digital communication bus and a circuit configured to switch connections between a reference voltage and the first set of interface pins. The controller can read a pin status of the at least one power stage via the digital communication bus. The pin status can indicate whether the reference voltage is detected at a second set of interface pins of the at least one power stage. The controller can, based on the pin status, detect a presence or an absence of an open pin condition between the first set of interface pins and the second set of interface pins.

20 Claims, 9 Drawing Sheets

DIGITAL OPEN PIN DETECTION

BACKGROUND

The present disclosure relates to systems, devices and methods for detecting open pin conditions between a controller and multiple power stages.

Different devices can be connected to each other in different configurations, such as a master-slave configuration. A master-slave configuration is where a master device controls a slave device. An example system utilizing the master-slave configuration is a power delivery system where a controller is the master and one or more power stages are the slave devices. A passive external network including wires or traces can connect different interface pins, including input and output pins, of the controller and the power stages. The interface pins can be used by the controller to provide commands to the power stages, and also for the power stages to provide feedback signals encoding various operating conditions to the controller to operate the power stages.

SUMMARY

In one embodiment, an integrated circuit is generally described. The integrated circuit can include a controller configured to control at least one power stage. The controller can include a first set of interface pins, a digital communication bus and a circuit configured to switch connections between a reference voltage and the first set of interface pins. The controller can be configured to read a pin status of the at least one power stage via the digital communication bus. The pin status can indicate whether the reference voltage is detected at a second set of interface pins of the at least one power stage. The controller can, based on the pin status, detect a presence or an absence of an open pin condition between the first set of interface pins and the second set of interface pins.

In one embodiment, an integrated circuit is generally described. The integrated circuit can include a power stage configured to convert an input voltage into an output voltage. The integrated circuit can further include a first set of interface pins, a digital communication bus, a circuit and a switch. The circuit can be configured to receive a command from a controller on the digital communication bus. The switch can be configured to switch connections between the circuit and the first set of interface pins based on the command from the controller. The circuit can be further configured to detect voltages on the first set of interface pins. The circuit can be further configured to, based on the voltages detected on the first set of interface pins, set a flag pin voltage and write a pin status of the power stage to a register. The pin status can indicate whether a reference voltage is detected on at least one of the first set of interface pins.

In one embodiment, a system is generally described. The system can include a power stage configured to convert an input voltage into an output voltage. The system can further include a controller configured to control the power stage. The system can further include an external passive network connecting a first set of interface pins of the controller to a second set of interface pins of the power stage. The power stage can be configured to detect voltages on the second set of interface pins. The power stage can be configured to, based on the voltages detected on the second set of interface pins, set a flag pin voltage and write a pin status of the power stage to a register in the power stage. The pin status can indicate whether a reference voltage is detected at the second set of interface pins of the power stage. The controller can be configured to switch connections between a voltage source and the first set of interface pins. The voltage source can be configured to generate the reference voltage. The controller can be further configured to read the pin status of the power stage via a digital communication bus. The controller can be further configured to, based on the pin status, detect a presence or an absence of an open pin condition in the external passive network.

Further features as well as the structure and operation of various embodiments are described in detail below with reference to the accompanying drawings. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
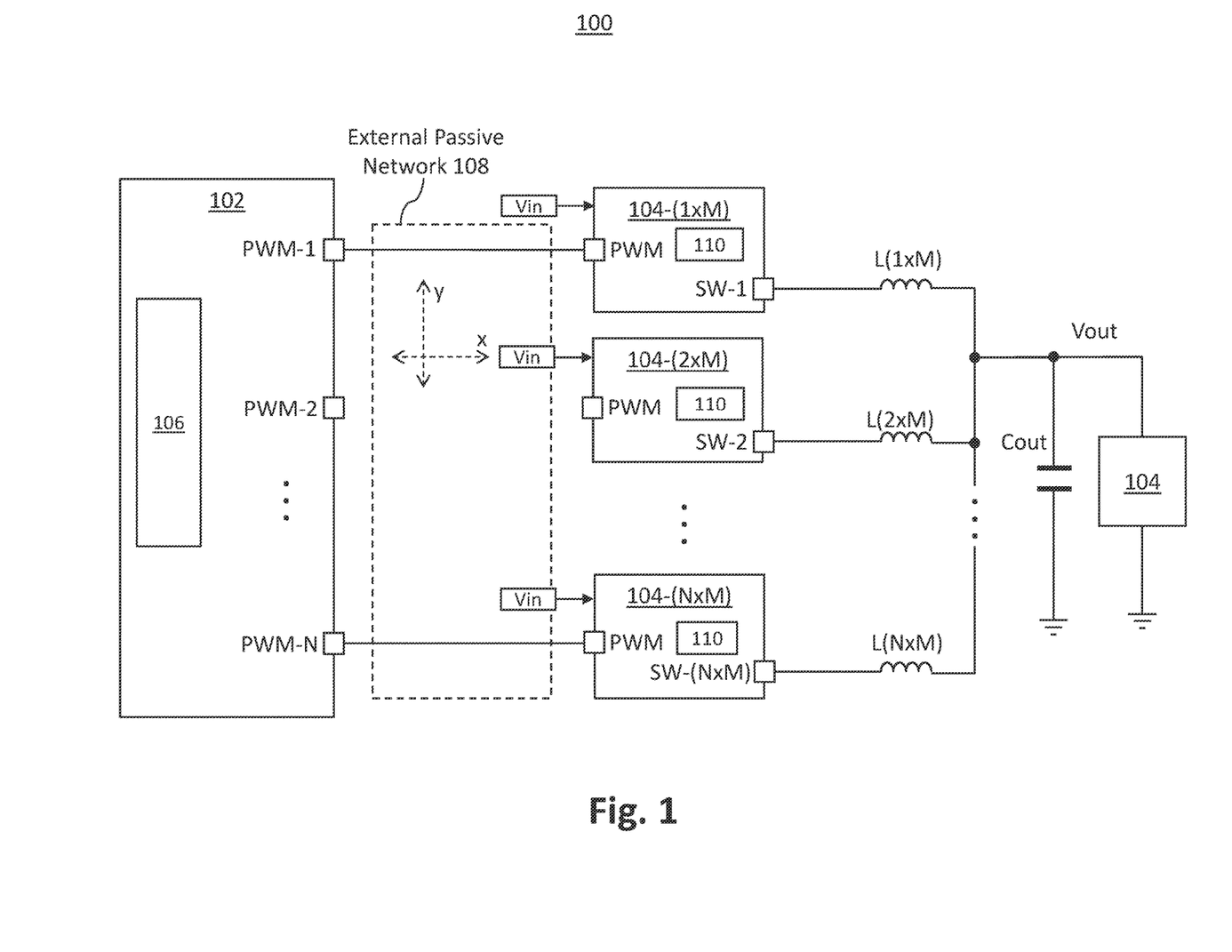
FIG. 1 is diagram showing an example system that can implement digital open pin detection in one embodiment.

FIG. 1 is diagram showing an example system that can implement digital open pin detection in one embodiment. System 100 can be a power delivery system configured to generate an output voltage Vout to provide power to a load 104. System 100 can be a part of a device and can be implemented by one or more semiconductor devices. System 100 can include at least a controller 102 and at least one power stage 104-(1×M), . . . , 104-(N×M) (collectively referred to as power stages 104 herein), where N varies from 1 to N and M varies from 1 to M. Power stages 104 can be identical to one another, such as having the same interface pins. Controller 102 can be, for example, a microcontroller including hardware such as various analog and digital circuit components. Controller 102 can be an integrated circuit including one or more semiconductor devices implementing, for example, a processor, central processing unit (CPU), field-programmable gate array (FPGA) or any other circuitry that is configured to control and operate various aspects of power stages 104.

In one embodiment, system 100 can be vertical power delivery (VPD) multiphase converter that can support up to 64 SPS for high current applications (e.g., N*M=64 if N varies from 1 to 8 and M varies from 1 to 8), where N is the number of PWM signals from controller 102 and M is the number of power stages 104 connected in parallel and sharing the same PWM signal. For example, if there are a total of 64 power stages, controller 102 can generate eight PWM signals and each PWM signal can be used for controlling eight power stages that are connected in parallel. Power stages 104 can be smart power stages (SPS) that include various components configured to perform voltage regulation and to detect and feedback information such as temperature and current to controller 102. Each one of power stages 104 can include power devices, such as a pair of switches implemented by metal-oxide-semiconductor field-effect transistors (MOSFETs). The pair of switches, which can be referred to as high-side switch (e.g., connected between input voltage Vin and corresponding switch node) and low-side switch (e.g., connected between switch node and ground). Controller 102 can be configured to generate and provide control signals, such as pulse width modulation (PWM) signals or pulse frequency modulation (PFM) signals, for power stages 104.

Controller 102 can generate individual control signals for individual power stages. By way of example, controller 102 can provide a first control signal to a power stage 104-1 (e.g., power stage 104-(1×M) when M=1) via PWM-1 output pin of controller 102 and power stage 104-1 can receive the first control signal at its PWM input pin. Controller 102 can further provide a second control signal to a power stage 104-2 (e.g., power stage 104-(2×M) when M=1) via PWM-2 output pin of controller 102 and power stage 104-2 can receive the second control signal at its PWM input pin. Further, each one of power stages 104 can include a driver circuit configured to generate gate voltages for driving the power switches. The power switches in each one of power stages 104 can be turned on and off based on PWM signal from controller 102. The duty cycle of high-side switch turn-on determines the value of the output voltage Vout.

Controller 102 and power stages 104 can be connected to one another using a passive external network 108. Passive external network 108 can include, for example, wires, traces, transmission lines and various components that can connect interface pins (e.g., input and output pins) of controller 102 and power stages 104. Controller 102 and power stages 104 can exchange signals using passive external network 108. By way of example, passive external network 108 can route control signals from controller 102 to power stages 104 and can route feedback signals from power stages 104 to controller 102.

In an aspect, an open condition can occur in passive external network 108. An open condition can be, for example, a situation where an interface pin is disconnected such that there is an opening between two interface pins that are supposed to be connected to one another. In some aspects, the open condition can be caused by broken wires, poor connections between passive external network 108 and controller 102 or power stages 104, a loose pin (or terminal or lead), or faulty components within external passive network 108. Some poor connections may be a result of soldering defects or defects with circuit traces. Further, the open condition may lead to problems such as thermal runaway and delivery of excessively high current, which can damage controller 102 and/or power stages 104.

In an aspect, conventional open pin detection approach can force a small current source on a target pin (e.g., the pin being checked for open condition), but this approach requires low impedance externally. This approach may require connecting an external component, such as an external resistor or capacitor, parallel to the interface pins (e.g., parallel to y-direction shown in FIG. 1) in order to detect open conditions in the y-direction parallel to the component. Further, this approach also can create challenge for high impedance pins and pins shared by multiple power stages. For example, for power delivery systems having variable number of power stages, such as VPDs including 2 to 64 SPS, For a pin with external capacitor and shared by variable numbers of power stages, the current forced to the pin for open detection varies with the number of power stages, it may not be feasible to control the timing to effectively detect open-pin.

To perform open condition or open pin detection, controller 102 can include a circuit 106 and each one of power stages 104 can include a circuit 110. Circuit 106 and circuit 110 can include various circuitry components that can be controlled by controller 102 and/or power stages to detect open pins in passive external network 108 and between controller 102 and power stages 104. Controller 102 can be configured to use a digital communication bus, or digital bus, between controller 102 and power stages 104 to provide commands for power stages 104 to control circuit 110. Power stages 104 can use a fault pins to provide flags indicating open conditions to controller 102, power stages 104 can also write the status register, Controller 102 can send command to power stages 104 to read the status register to debug which power stage and which pin has open-pin issue. Further, controller 102 and power stages 104 can operate circuits 106, 110, respectively, to detect open pins before start-up of system 100 such that system 100 can operate under safe and reliable conditions. The open pin detection being performed by system 100 can provide an open pin detection scheme that is suitable for large number and variable number of power stages.

Figure 2:
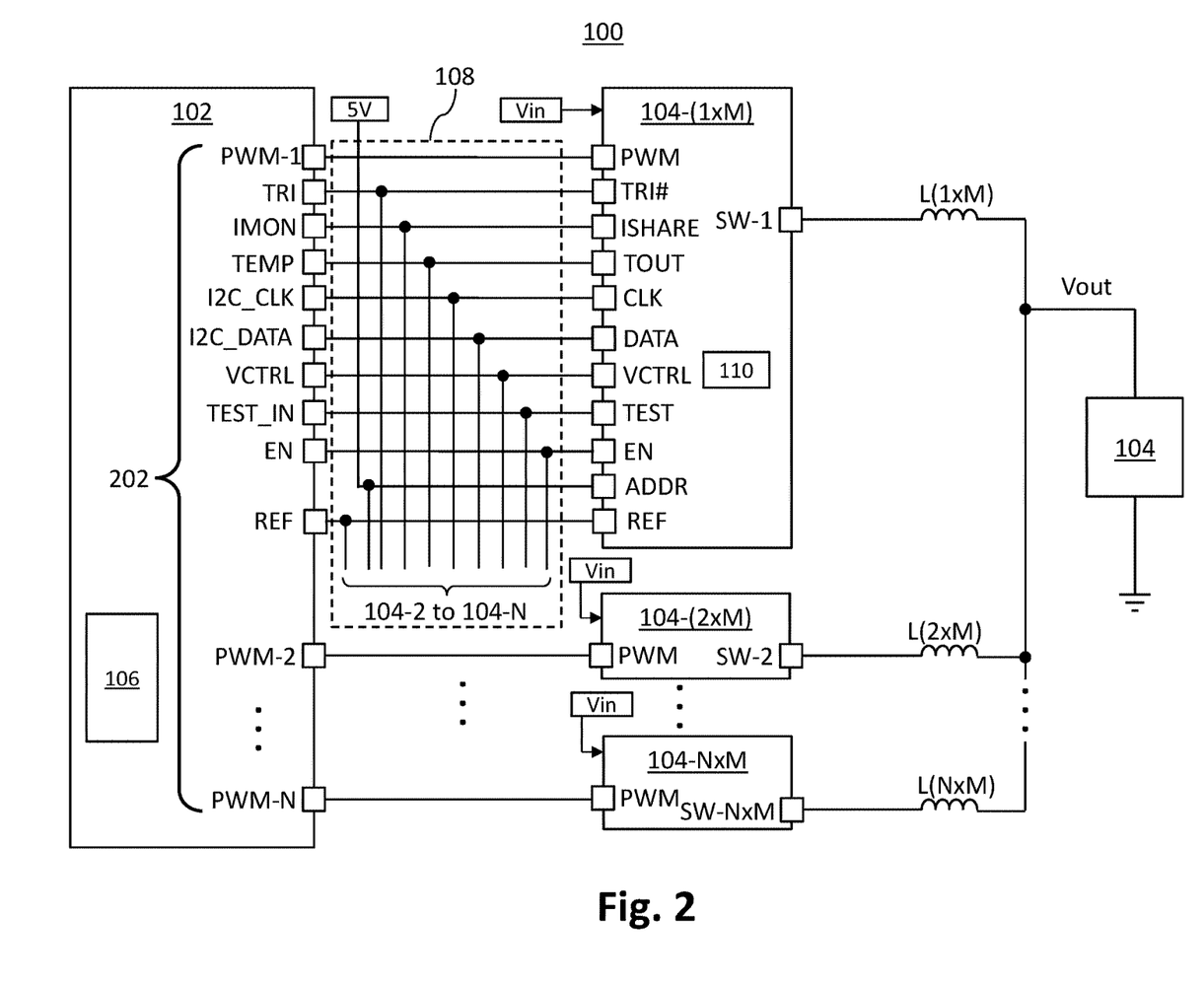
FIG. 2 is diagram showing additional details of the example system in FIG. 1 in one embodiment.

FIG. 2 is diagram showing additional details of the example system in FIG. 1 in one embodiment. Description of FIG. 2 can reference components shown in FIG. 1. In an example shown in FIG. 2, a plurality of interface pins 202 between controller 102 and power stages 104 are shown. A portion of interface pins 202 can be shared between different power stages among power stages 104. To be described in more detail below, to perform open pin detection, controller 102 can control circuit 106 and provide commands to power stages 104 to check whether open condition is present or absent in passive external network 108.

In the embodiment shown in FIG. 2, interface pins 202 of controller 102 can include the PWM-1, . . . . PWM-N pins, connected to PWM pins of power stages 104, for providing control signals to power stages 104. Interface pins 202 of controller 102 can also include a TRI pin, connected to TRI #pins of power stages 104, for activating tristate mode of power stages 104. Interface pins 202 of controller 102 can also include an IMON pin, connected to ISHARE pins of power stages 104, for receiving sensed current from power stages 104. Interface pins 202 of controller 102 can also include a TEMP pin, connected to TOUT pins of power stages 104, for receiving sensed temperatures from power stages 104. Interface pins 202 of controller 102 can also include an I2C_CLK pin, connected to CLK pins of power stages 104, for providing clock signal under the Inter- Integrated Circuit (I2C) communication protocol to power stages 104. Interface pins 202 of controller 102 can also include an I2C_DATA pin, connected to DATA pins of power stages 104, for providing data signal under the I2C communication protocol to power stages 104. Interface pins 202 of controller 102 can also include a VCTRL pin, connected to VCTRL pins of power stages 104, for maintaining the voltage being outputted at Vout at a target voltage level. Interface pins 202 of controller 102 can also include a TEST_IN pin, connected to TEST pins of power stages 104, for receiving various flags and test signals from power stages 104. Interface pins 202 of controller 102 can also include an EN pin, connected to EN pins of power stages 104, for selectively enabling or disabling power stages 104. Interface pins 202 of controller 102 can also include an REF, connected to REF pins of power stages 104, for providing reference voltages to power stages 104.

In one embodiment, controller 102 can operate switches in circuit 106 to connect a predefined reference voltage to interface pins 202 in a sequential manner or in parallel (e.g., connect to all at the same time). Controller 102 can provide commands to power stages 104 via a digital bus, such as an I2C bus connecting the I2C_CLK and I2C_DATA pins of controller 102 to CLK and DATA pins of each one of power stages 104. Power stages 104 can receive the command and based on the command, operate switches in circuit 110 to connect interface pins of power stages 104 to a window comparator in circuit 110 sequentially or in parallel. The window comparator in circuit 110 can output flags in response to an absence of the reference voltage on the interface pin connected to the window comparator. The flags can be stored in registers of power stages 104 and power stages 104 can notify controller 102, via flag pins, a presence of open condition. In one embodiment, one or more pins among interface pins 202 can be used by power stages 104 to provide the flags to controller 102. By way of example, the TEST pin and the TOUT pin of power stages can be used by power stages 104 to provide the flags to the TEST_IN pin and TEMP pin of controller 102.

Figure 3:
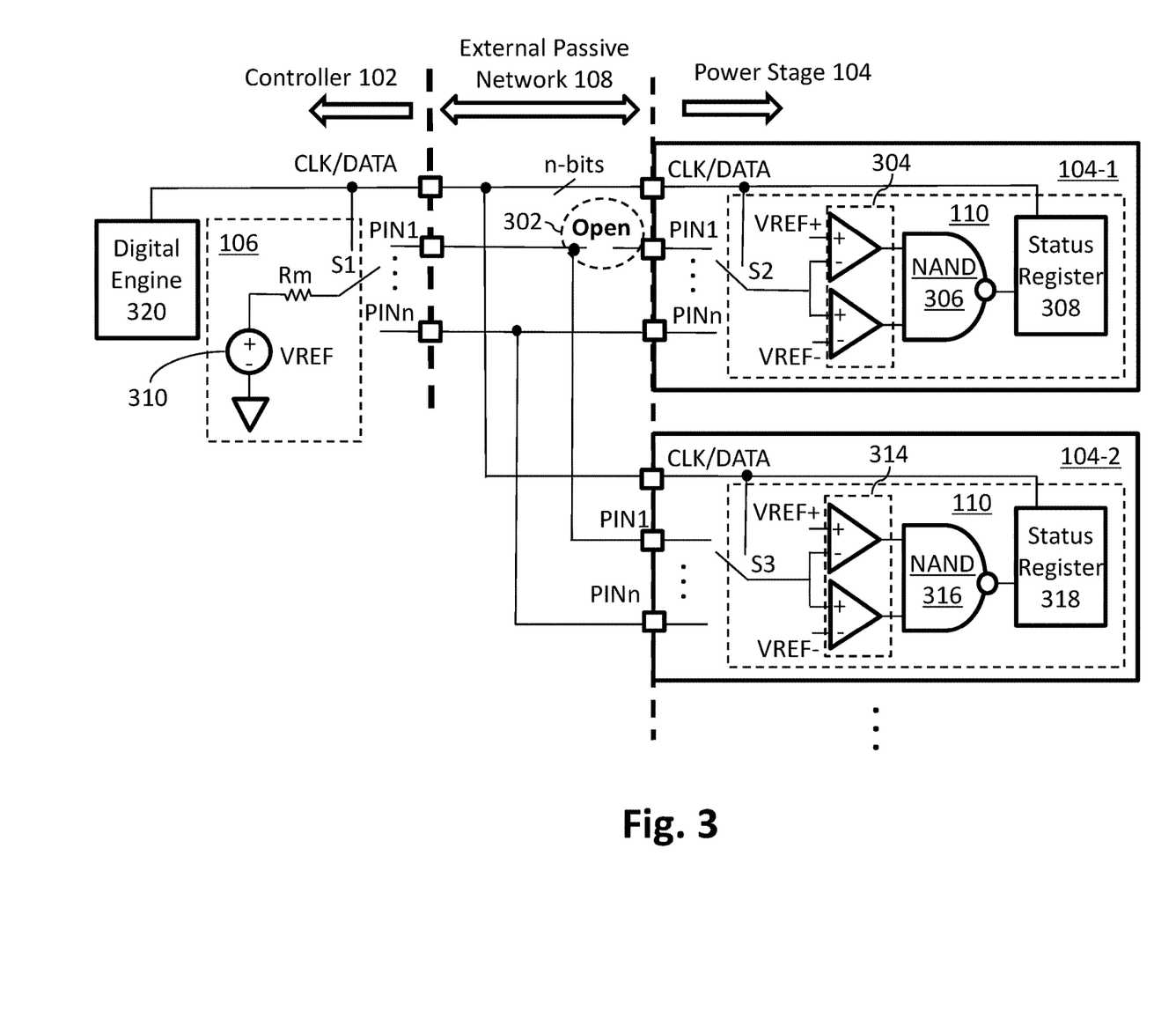
FIG. 3 is diagram showing an example implementation that can implement digital open pin detection in one embodiment.

FIG. 3 is diagram showing an example implementation that can implement digital open pin detection in one embodiment. Description of FIG. 2 can reference components shown in FIG. 1 to FIG. 2. In an embodiment shown in FIG. 3, system 100 can perform a serial check to determine presence or absence of open pins in passive external network 108. Circuit 106 in controller 102 can include a voltage source 310, a resistor Rm and a switch S1. Voltage source 310 can be configured to generate and output a reference voltage VREF. Switch S1 can be controlled by controller 102 to switch connections between voltage source 310 and one or more interface pins PIN1, . . . . PINn of controller 102. The one or more interface pins PIN1, . . . . PINn can include interface pins shown in FIG. 2. Controller 102 can include a digital engine 320 configured to generate clock signals to be transmitted from the I2C_CLK pin of controller 102 to the CLK pins of power stages 104. Digital engine 320 can also be configured to generate and output digital data signals that encode various information and/or commands to power stages 104. In one embodiment, digital engine 320 can be a processor such as a CPU.

Circuit 110 in power stages 104-1 can include a switch S2, a voltage window comparator 304, a NAND gate 306, and a status register 308. Circuit 110 in power stages 104-2 can be identical to circuit 110 in power stage 104-1, and can include a switch S3, a voltage window comparator 314, a NAND gate 316, and a status register 318. Interface pins PIN1, . . . . PINn of each one of power stages 104 can be connected to corresponding interface pins among interface pins PIN1, . . . . PINn of controller 102.

In one embodiment, to perform the serial check detect open pins, controller 102 can control digital engine 302 to generate a digital signal encoding one or more commands to perform serial open pin check and other instructions such as timings for the open pin check. By way of example, digital engine 320 can generate digital data encoding a command to all power stages 104 to start the serial open pin check. Digital engine 320 can also generate digital data encoding timings for power stages 104 to serially check each one of pins PIN1, . . . . PINn. For example, controller 102 can instruct all power stages among power stages 104 to check their interface pin PIN1 at a first time interval, and instruct power stages 104 to check their interface pin PIN2 at a second time interval.

Using power stage 104-1 as an example, to perform an open pin check during the serial check, controller 102 can control switch S1 to connect VREF to a target pin and power stage 104-1 can control switch S2 to connect a pin corresponding to the target pin to voltage window comparator 304. By way of example, if pin PIN1 is a target pin to be checked for open pin, controller 102 can switch S1 to connect VREF to its PIN1 and power stage 104-1 can switch S2 to connect voltage window comparator 304 to its PIN1. In the example shown in FIG. 3, power stage 104-1 will not sense VREF due to an open pin 302 between the two PIN1 of controller 102 and power stage 104-1. In response to an absence of VREF on PIN1 at power stage 104-1, the input to voltage window comparator 304 via switch S2 will be outside of the voltage window bound by VREF− and VREF+. The input to voltage window comparator 304 being outside of the voltage window can cause NAND gate 306 to output high voltage or a binary '1'. The high voltage being outputted by NAND gate 306 can write a binary '1' to a particular bit in status register 308, where the particular bit is assigned to PIN1. This high voltage can also set the flag pins high to report open-pin fault to controller 102.

After checking PIN1, controller 102 can control switch S1 to connect VREF to a new target pin, such as a pin PIN2, and power stage 104-1 can control switch S2 to connect a pin corresponding to the new target pin, such as PIN2 of power stage 104-1, to voltage window comparator 304. If power stage 104-1 sense VREF from the pin PIN2, then the input to voltage window comparator 304 via switch S2 will be inside the voltage window bound by VREF− and VREF+. The input to voltage window comparator 304 being inside of the voltage window can cause NAND gate 306 to output low voltage or a binary '0'. The low voltage being outputted by NAND gate 306 can write a binary '0' to a particular bit in status register 308 that is assigned to PIN2. Controller 102 and power stage 104-1 can continue to perform the serial check until the last pin PINn. After checking the last pin PINn, controller 102 can read the flag pins to determine if there is open pin between controller 102 and power stages 104. In one embodiment, the voltage of the flag pins can indicate if any open-pin fault has occurred. If a high voltage is detected on the flag pin, controller 102 can determine that open-pin occurs and can read status register 308 using the digital bus (e.g., the I2C bus) to determine which pin is open between controller 102 and power stage 104-1. Each bit of the Status register 308 represents the connection status of one interface pin.

Figure 4:
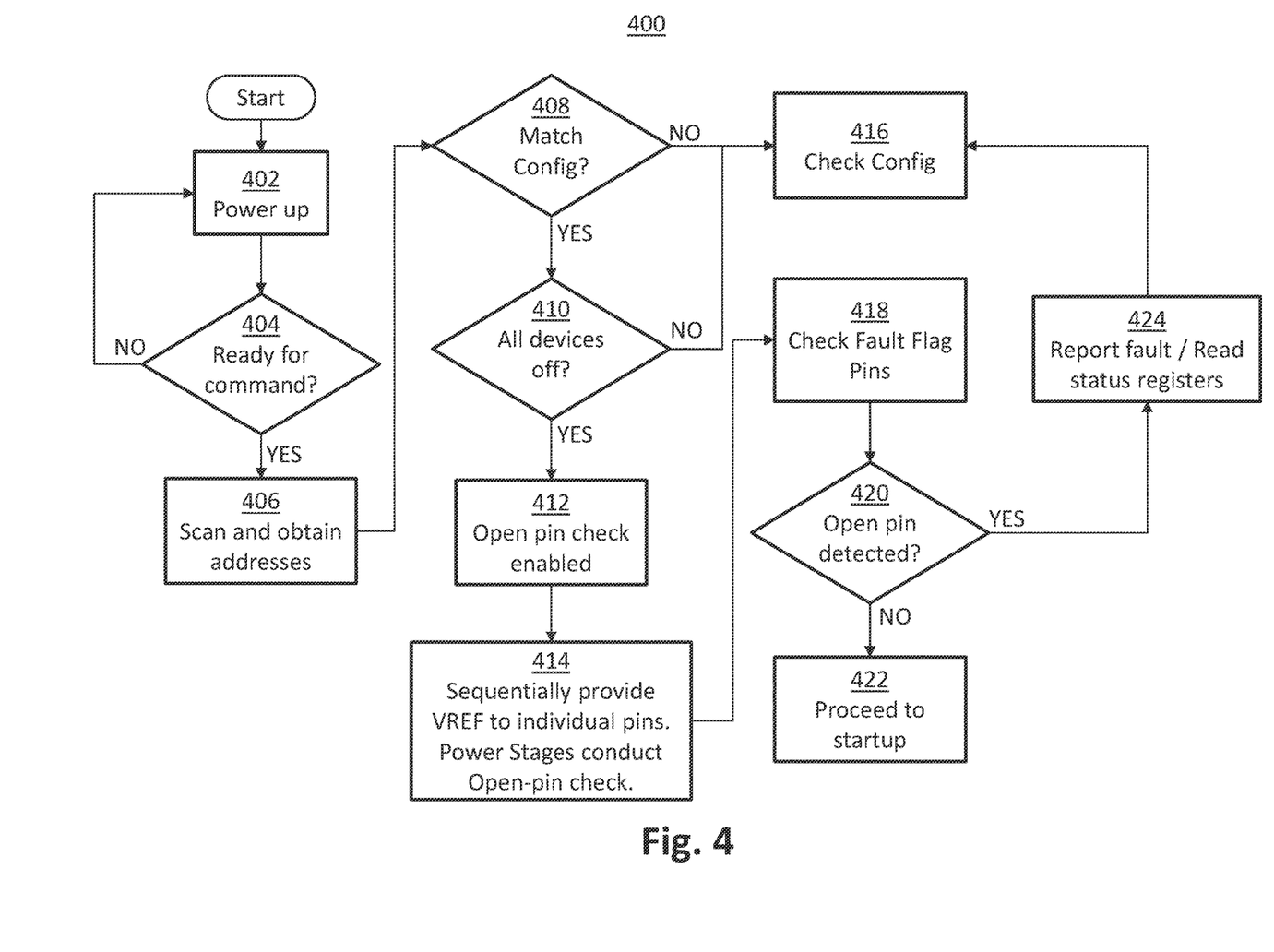
FIG. 4 is a flow diagram illustrating a process to implement digital open pin detection in one embodiment.

FIG. 4 is a flow diagram illustrating a process to implement digital open pin detection in one embodiment. Description of FIG. 2 can reference components shown in FIG. 1 to FIG. 3. The process 400 can include one or more operations, actions, or functions as illustrated by one or more of blocks 402, 404, 406, 408, 410, 412, 414, 416, 418, 420, 422, and/or 424 Although illustrated as discrete blocks, various blocks may be divided into additional blocks, combined into fewer blocks, eliminated, performed in different order, or performed in parallel, depending on the desired implementation.

Process 400 can be performed by, for example, system 100, shown in FIG. 1. Process 400 can begin at block 402. At block 402, controller 102 and power stages 104 are powered up. Block 402 can proceed to block 404. At block 404, controller 102 can determine if the power stages 104 are initialized, configured, and ready to receive commands. The determination can include determining a voltage supply power-on reset (VCC POR) and/or readiness to receive and respond to PMBus or I2C communication protocol commands on the digital bus (e.g., I2C bus). If power stages 104 are not ready for commands, process 400 returns back to block 402. However, if power stages 104 are ready for commands, process 400 can continue from block 404 to block 406. At block 406, controller 102 can send a command to power stages 104 to scan and obtain device addresses. For example, controller 102 can scan for the number of device address configured to the controller 102. In one embodiment, controller 102 can use commands such as Ansible Reporting and Analysis (ARA) commands to obtain the device addresses. Process 400 can continue from block 406 to block 408. At block 408, controller 102 can check for matching configurations. For example, controller 102 can check if the total scanned device addresses match the amount of obtained device addresses and also match the amount of device addresses in programmed configuration of controller 102.

If a mismatch is discovered, process 400 can continue from block 408 to block 416. At block 416, controller 102 can stop operation to allow for manual debugging, e.g., checking a config file or checking for properly connected interface pins. Also at block 408, if no mismatches were found, process 400 can continue from block 408 to block, 410. At block 410, controller 102 can be configured to check if power stage 104 switches, such as high-side (HS) and low-side (LS) switches, are off. In an aspect, the HS and LS switches of power stages 104 can be turned off by default. However, controller 102 can send a command to turn off all the HS and LS switches of all connected SPS as an extra precautionary step. Controller 102 can then verify if switches in each SPS are in the "off" state. If not all switches are off, process 400 can continue from block 410 back to block 416 for debugging. If all switches are off, process 400 can continue from block 410 to block 412.

At block 412, controller 102 enables the serial open pin check operation. Controller 102 can send a command such as "OPENPINCHECK_ENABLE" to all SPS addresses for every power stage 104 to be ready for the open pin check. In one embodiment, the command can include commanding power stages 104 to release or disconnect target pins (e.g., interface pins to be checked for open condition) from ground, from any existing internal connections such as any low impedance pull or from any voltage or current source. The release of pin connections by power stages 104 in block 412 can ensure that the reference voltage VREF will be the sole voltage source connected to a target pin (e.g., the pin being checked) during the open pin check. Process 400 can continue from block 412 to 414.

At block 414, controller 102 can be configured to sequentially provide VREF to each pin to check if the connection is open. By way of example, controller 102 can check the first pin PIN1 by switching switch S1 to connect VREF to PIN1. Controller 102 can wait for a lapse of a predefined amount of time to ensure that circuit 110 in power stages 104 has sufficient time to read an output from NAND gates and write the output in respective status registers (e.g., see FIG. 3). After the lapse of time, controller 102 can move on to check the next pin by switching S1 to disconnect PIN1 from VREF and to connect the next pin, such as PIN2, to VREF. In one embodiment, after the lapse of time, controller 102 can send a command on the I2C bus to provide a command to power stages 104 to switch connection of their voltage window comparators to the next pin. Controller 102 can wait for the lapse of the predefined amount of time before switching S1 again to check the next pin after PIN2. Controller 102 can continue to sequentially switch S1 to connect different pins to VREF to check for open conditions until the last pin PINn. Power stages 104 can set TMON and CFP pin to a "high" state as well as setting the corresponding Status register bit to report a flag indicating presence of a fault if any of power stages 104 detects open for one or more pins. Process 400 can continue from block 414 to block 418 and 420 after all pins have been checked.

At blocks 418 and 420, controller 102 can be configured to check the flag pins. Controller 102 will decide if any open-pin fault is detected according to the voltage on the flag pins. If controller 102 detects flag pin high, controller determines that open-pin fault occurs at one or more power stages, and at one or more pins. Process 400 will continue from 420 to 424. If controller 102 doesn't detect any flag pin high, controller 102 determines that no open-pin fault occurs.

If no open pins were detected, process 400 can continue from block 420 to block 422. At block 422, power stages will release their TMON pin. In an aspect, the TMON pin is a power stage multifunction pin, it works as both temperature sense output pin and fault flag. TMON is configured to be hold low at power-on. It will be pulled high if any open-pin fault happens at power-on. At block 422, since no open pin is detected, TMON stays low, power stages 104 can release TMON to output temperature sense information. Controller 102 can proceed to startup after receiving normal TMON voltage.

However, if an open pin was detected at block 420, process 400 can continue from block 420 to block 424. At block 424, controller 102 will assert the fault. Controller 102 can also send commands to read the status registers of power stages 104. In one embodiment, controller 102 can also determine and specify the faulty pin by determining which power stage provided the register word that includes an indication (e.g., binary '1') of open pin. The usage of TMON and CFP pin can allow controller 102 to detect open pin conditions without a need to add additional pins to controller 102 and/or power stages 104. Process 400 then continues from block 424 back to block 416 for manual debugging.

Figure 5:
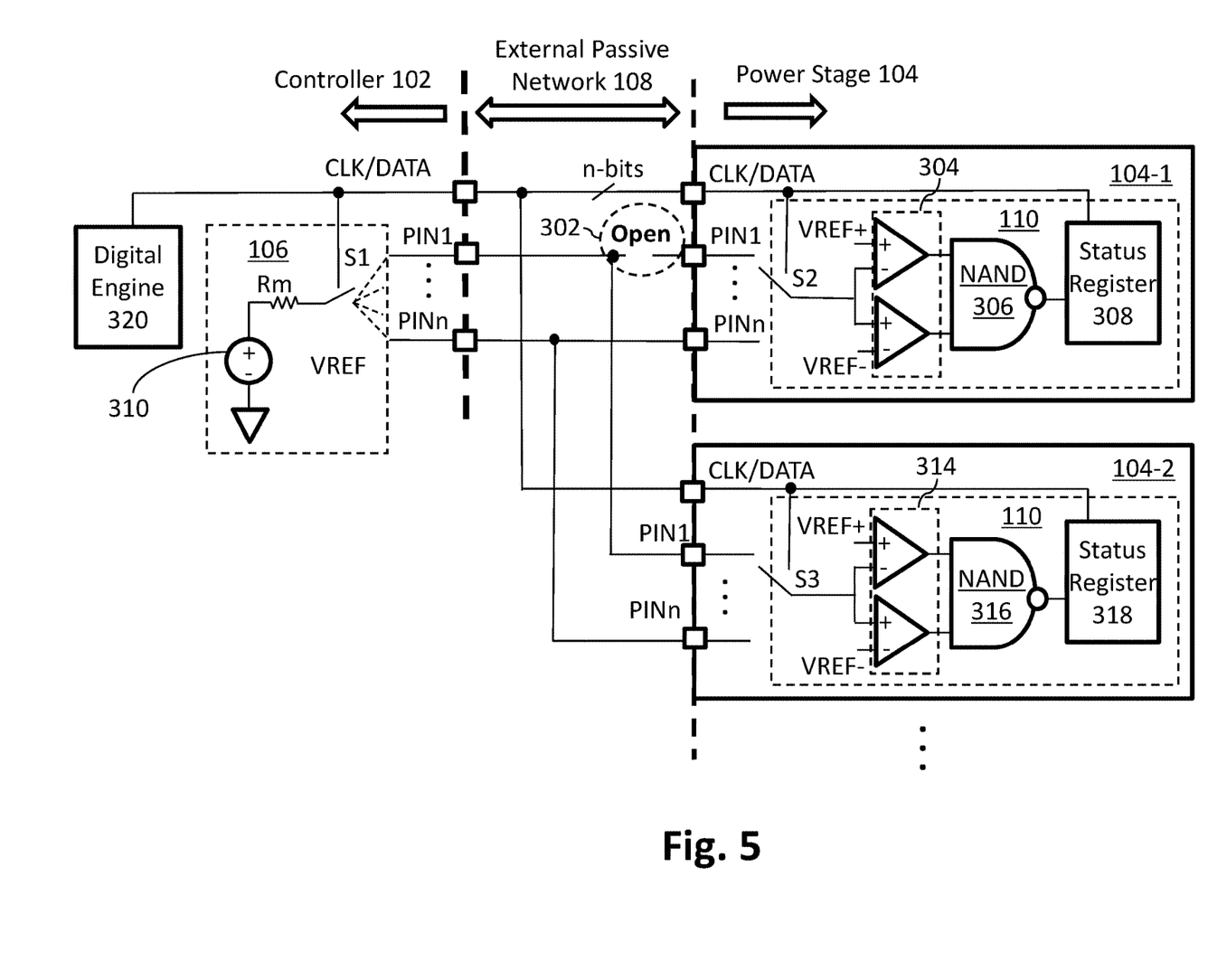
FIG. 5 is diagram showing another example implementation that can implement digital open pin detection in one embodiment.

FIG. 5 is diagram showing another example implementation that can implement digital open pin detection in one embodiment. Description of FIG. 5 can reference components shown in FIG. 1 to FIG. 4. In an embodiment shown in FIG. 5, system 100 can perform a parallel check to determine presence or absence of open pins in passive external network 108.

In one embodiment, to perform the parallel check to detect open pins, controller 102 can control digital engine 320 to generate a digital signal encoding one or more commands to perform parallel open pin check and other instructions such as timings for the open pin check. By way of example, digital engine 320 can generate digital data by encoding a command to all power stages 104 to start the parallel open pin check. Digital engine 320 can also generate digital data encoding timings for power stages 104 to parallel check each one of pins PIN1, . . . . PINn. For example, controller 102 can instruct power stages 104 to check their interface pin PIN1 at a first time interval, and instruct power stages 104 to check interface pin PIN2 at a second time interval.

Using power stage 104-1 as an example, to perform an open pin check during the parallel check, controller 102 can control switch S1 to connect VREF to all pins PIN1-PINn of controller 102. Power stage 104-1 can control switch S2 to connect a pin corresponding to the target pin to voltage window comparator 304. By way of example, if pin PIN1 is a target pin to be checked for open pin, controller 102 can switch S1 to connect VREF to all of its pins and power stage 104-1 can switch S2 to connect voltage window comparator 304 to its PIN1. In the example shown in FIG. 5, power stage 104-1 will not sense VREF due to an open pin 302 between the two PIN1 of controller 102 and power stage 104-1. In response to an absence of VREF on PIN1 at power stage 104-1, the NAND gate 306 outputs a high voltage or a binary '1'. The high voltage being outputted by NAND gate 306 can write a binary '1' to a particular bit in status register 308, where the particular bit is assigned to PIN1. Power stage 104-1 will also pull the flag pins high to report the fault.

Controller 102 can maintain switch S1 at a close state to all pins PIN1 to PINn in order to keep VREF connected to all pins PIN1 to PINn. After all power stages 104 check their PIN1, the power stages 104 can control their respective switch S2 to connect a pin corresponding to the new target pin, such as PIN2 of power stages 104, to their respective voltage window comparators. The connection of all pins on controller 102 to VREF can reduce processing time when compared to the embodiment shown in FIG. 3 since controller 102 can perform one operation to connect to all pins without a need to sequentially switch connections of the pins to VREF. Power stages 104 can continue to perform the parallel check until the last pin PINn. After checking the last pin PINn, controller 102 can detect the voltage on the flag pins. If flag pin voltage is not high which indicates all pin connections are good, controller can continue the startup. If flag pin high is detected which indicates an open-pin fault occurs, controller 102 can read status register 308 using the digital bus (e.g., the I2C bus) to determine the power stages and pins with fault.

Figure 6:
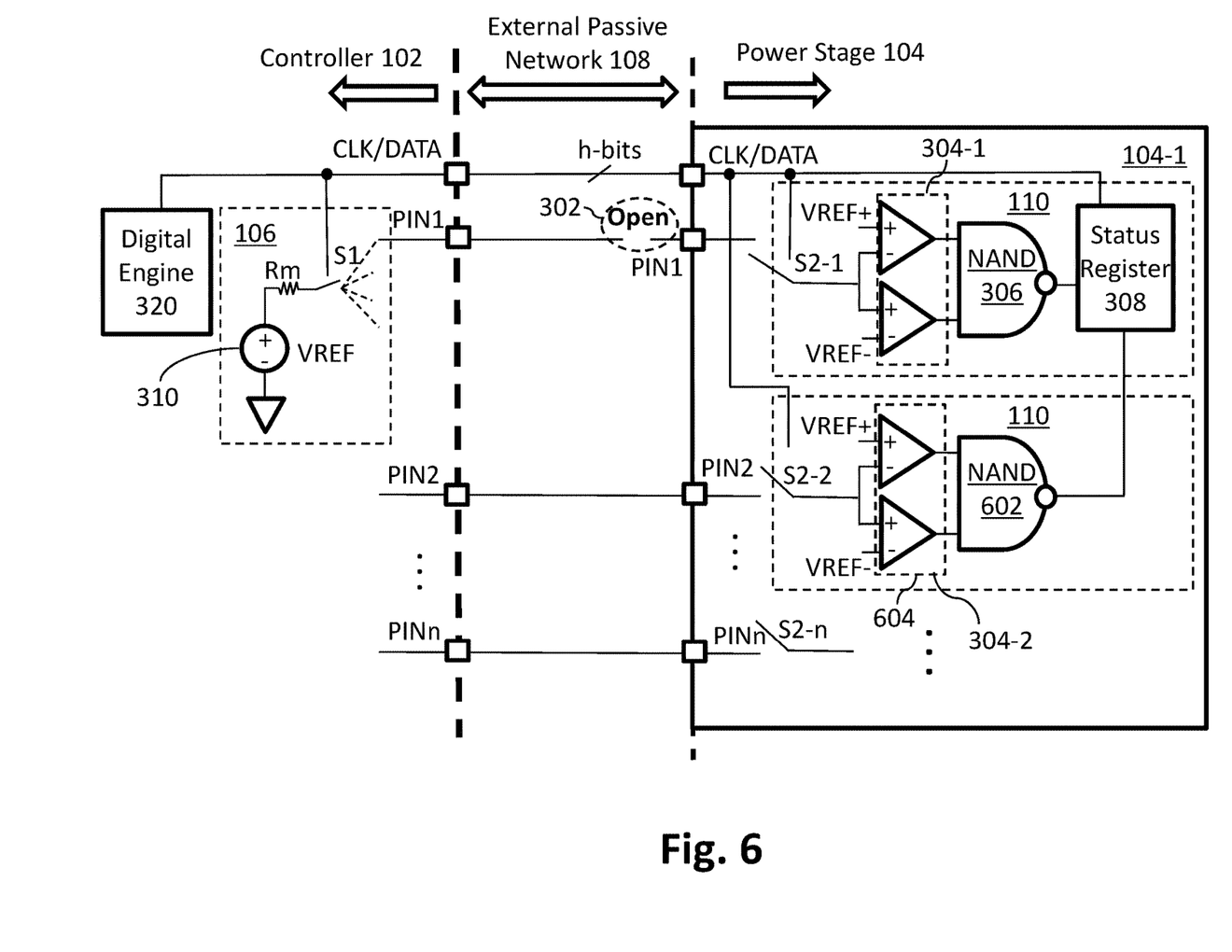
FIG. 6 is diagram showing another example implementation that can implement digital open pin detection in one embodiment.

FIG. 6 is diagram showing another example implementation that can implement digital open pin detection in one embodiment. Description of FIG. 2 can reference components shown in FIG. 1 to FIG. 5. In an embodiment shown in FIG. 5, system 100 can perform a parallel check to determine presence or absence of open pins in passive external network 108.

In an embodiment shown in FIG. 6, system 100 can perform a parallel check to determine presence or absence of open pins in passive external network 108. Controller 102 can include a digital engine 320 configured to generate clock signals to be transmitted to the CLK pins of power stages 104. Digital engine 320 can also be configured to generate and output digital data signals that encode various information and/or commands to power stages 104.

In the example embodiment shown in FIG. 6, each one of power stages 104 can include n copies of circuit 110 for the n interface pins PIN1 to PINn. Using power stage 104-1 as an example, one copy of circuit 110 is connected to PIN1 and another copy of circuit 110 is connected to PIN2. PIN1 of power stage 104-1 can be connected to a voltage window comparator 304-1 using a switch S2-1. The output of voltage window comparator 304-1 can be connected to NAND gate 306 and status register 308. PIN2 of power stage 104-1 can be connected to a voltage window comparator 304-2 using a switch S2-2. The output of voltage window comparator 304-2 can be connected to another NAND gate 602 and to status register 308. Interface pins PIN1, . . . . PINn of each one of power stages 104 can be connected to corresponding interface pins among interface pins PIN1, . . . . PINn of controller 102.

In one embodiment, to perform the parallel check to detect open pins, controller 102 can control digital engine 320 to generate a digital signal encoding one or more commands to perform parallel open pin check and other instructions such as timings for the open pin check. By way of example, digital engine 320 can generate digital data encoding a command to all power stages 104 to start the parallel open pin check. The command by digital engine 320 can be outputted as a command signal on the CLK/DATA line (e.g., CLK and DATA lines for I2C communication). The command signal on the CLK/DATA line can trigger controller 102 to control switch S1 to connect VREF to all pins PIN1-PINn of controller 102. The command signal on the CLK/DATA line can also trigger switches S2-1, S2-2, . . . . S2-$n$ to close to connect all pins PIN1 to PINn of power stage 104-1 to corresponding voltage window comparators. The command signal can also close all switches for power stages other than power stage 104-1. As a result of closing all the switches on both controller 102 side and power stage side, the open pin detection can be performed in parallel.

In the example shown in FIG. 6, power stage 104-1 will not sense VREF on PIN1 due to an open pin 302 between the two PIN1 of controller 102 and power stage 104-1. In response to an absence of VREF on PIN1 at power stage 104-1, the NAND gate 306 outputs a high voltage or a binary '1'. The high voltage being outputted by NAND gate 306 can write a binary '1' to a particular bit in status register 308, where the particular bit is assigned to PIN1. On the other hand, power stage 104-1 will sense VREF on PIN2 due since there is no open pin between the two PIN2 of controller 102 and power stage 104-1. In response to a presence of VREF on PIN2 at power stage 104-1, the NAND gate 602 can output a low voltage or a binary '0'. The low voltage being outputted by NAND gate 602 can write a binary '0' to a particular bit in status register 308, where the particular bit is assigned to PIN2.

The connection of all pins on controller 102 to VREF, and all pins on all power stages 104 to corresponding voltage window comparators, in FIG. 6 can reduce processing time when compared to the embodiment shown in FIG. 3 since controller 102 can perform on operation to connect to all pins without a need to sequentially switch connections of the pins to VREF. The embodiment in FIG. 6 can occupy more silicon area when compared to the embodiment of FIG. 3. Therefore, the open pin detection described herein can be flexible for different applications, such as applications that may need fast open pin detection or applications that are implemented by smaller devices. After checking the last pin PINn, controller 102 can read status register 308 using the digital bus (e.g., the I2C bus). If controller 102 read all zeros from a status register, such as status register 308, then controller 102 can determine that there is no open pin between controller 102 and power stage 104-1. If controller 102 read at least one binary '1' from status register 308, then controller 102 can determine that there is an open pin between controller 102 and power stage 104-1.

Figure 7:
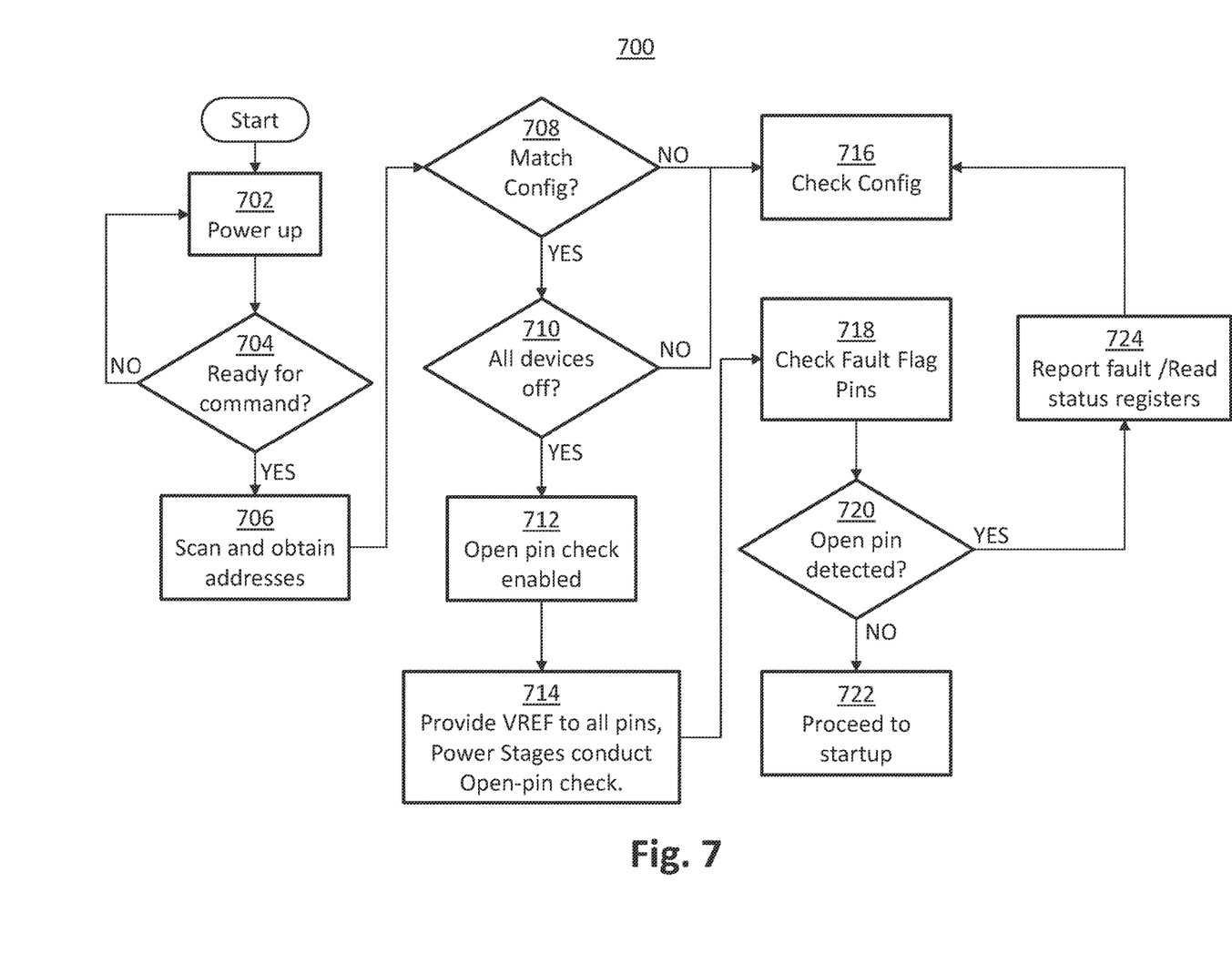
FIG. 7 is a flow diagram illustrating another process to implement digital open pin detection in one embodiment.

FIG. 7 is a flow diagram illustrating another process to implement digital open pin detection in one embodiment. Description of FIG. 2 can reference components shown in FIG. 1 to FIG. 6. The process 700 can include one or more operations, actions, or functions as illustrated by one or more of blocks 702, 704, 706, 708, 710, 712, 714, 716, 718, 720, 722, and/or 724. Although illustrated as discrete blocks, various blocks may be divided into additional blocks, combined into fewer blocks, eliminated, performed in different order, or performed in parallel, depending on the desired implementation.

Process 700 can be performed by, for example, system 100, shown in FIG. 1. Process 700 can begin at block 702. At block 702, controller 102 and power stages 104 are powered up. Block 702 can proceed to block 704. At block 404, controller 102 can determine if the power stages 104 are initialized, configured, and ready to receive commands. The determination can include determining a voltage supply power-on reset (VCC POR) and/or readiness to receive and respond to PMBus or I2C communication protocol commands on the digital bus (e.g., I2C bus). If power stages 104 are not ready for commands, process 700 returns back to block 702. However, if power stages 104 are ready for commands, process 700 can continue from block 704 to block 706. At block 706, controller 102 can send a command to power stages 104 to scan and obtain device addresses. For example, controller 102 can scan for the number of device address configured to the controller 102. In one embodiment, controller 102 can use commands such as Ansible Reporting and Analysis (ARA) commands to obtain the device addresses. Process 700 can continue from block 706 to block 708. At block 708, controller 102 can check for matching configurations. For example, controller 102 can check if the total scanned device addresses match the amount of obtained device addresses and also match the amount of device addresses in programmed configuration of controller 102. If a mismatch is discovered, process 700 can continue from block 708 to block 716. At block 716, controller 102 stops operation to allow for manual debugging, e.g., checking a config file or checking for properly connected pins. Also at block 708, if no mismatches were found, process 700 can continue from block 708 to block 710. At block 710, controller 102 can be configured to check if power stage 104 switches, such as, the HS and LS switches, are off. Typically, the HS and LS switches of power stages 104 can be turned off by default. However, controller 102 can send a command to turn off all the HS and LS switches of all connected devices as an extra precautionary step. Controller 102 can then verify if the switches in each SPS are in the "off" state. If not all switches are off, process 700 can continue from block 710 back to block 716 for debugging. If all switches are off, process 700 can continue from block 710 to block 712.

At block 712, controller 102 enables the parallel open pin check operation. Controller 102 can send a command such as "OPENPINCHECK_ENABLE" to all SPS addresses for every power stage 104 to be ready for the open pin check. In one embodiment, the command can include commanding power stages 104 to release or disconnect target pins (e.g., interface pins to be checked for open condition) from ground, from any existing internal connections such as low impedance pull or connections from any voltage or current source. The release of pin connects by power stages 104 in block 712 can ensure that the reference voltage VREF will be the sole voltage source connect to a target pin (e.g., the pin being checked) during the open pin check. Process 700 can continue from block 712 to 714. At block 714, controller 102 can be configured to provide VREF to every pin from PIN1 to PINn.

In a first embodiment (e.g., corresponding to FIG. 5), all power stages 104 can turn on a respective switch to connect PIN1 to a corresponding voltage window comparator. In the first embodiment, at block 714, the power stages can sequentially check for open pins from PIN1 to PINn while controller 102 maintains a state of switch S1 to keep all pins on controller 102 connected to VREF. For example, all power stages can check PIN1 in parallel. Each one of power stages 104 can wait for a lapse of a predefined amount of time to ensure that an output is read from NAND gates and the output from the NAND gate is written in respective status registers (e.g., see FIG. 5 or FIG. 6). In the first embodiment, after the lapse of time, all power stages 104 can move on to check the next pin by switching their respective switches to connect the next pin, such as PIN2 to a corresponding NAND gate. All power stages can then check PIN2 in parallel. Controller 102 can maintain the connection between all of its pins with VREF until all pins of all power stages 104 are checked.

In a second embodiment (e.g., corresponding to FIG. 6), all power stages 104 can turn on all switches to connect all pins PIN1 to PINn to corresponding voltage window comparators. In the second embodiment, at block 714, the power stages can check for open pins for all pins PIN1 to PINn in parallel while controller 102 maintains a state of switch S1 to keep all pins on controller 102 connected to VREF. Controller 102 can maintain the connection between all of its pins with VREF until all pins of all power stages 104 are checked.

In one embodiment, after the lapse of the predefined amount of time, controller 102 can send a command on the I2C bus to provide a command to power stages 104 to switch connection of their voltage window comparators to the next pin while the connection between VREF and all interface pins of controller 102 remains. Power stages 104 can set TMON and CFP pin to a "high" state to report a flag indicating presence of a fault if any power stage senses open for any pin among PIN1 to PINn.

Process 700 can continue from block 714 to block 718 and 720 after all pins have been check. At block 718, controller 102 is configured to check the flag pins (e.g., TMON and CFP). Controller 102 will decide if any open-pin fault is detected according to the voltage on the flag pins. If controller 102 detects flag pin high, controller determines that open-pin fault occurs at one or more power stages, and at one or more pins. Process 700 will continue from 720 to 724. If controller didn't detect any flag pin high, controller determines that no open-pin fault occurs.

If no open pins were detected, process 700 can continue from block 720 to block 722. At block 722, power stages 104 will release their TMON pin. In an aspect, the TMON pin is a power stage multifunction pin, it works as both temperature sense output pin and fault flag. TMON is configured to be hold low at power-on. It will be pulled high if any open-pin fault happens at power-on. At block 422, since no open pin is detected, TMON stays low, power stages 104 can release TMON to output temperature sense information. Controller 102 will continue startup after receiving normal TMON voltage.

However, if an open pin was detected at block 720, process 700 can continue from block 720 to block 724. At block 724, controller 102 will assert a fault. Controller 102 can also send commands to read the status registers of power stages 104. In one embodiment, controller 102 can also determine and specify the faulty pin by determining which power stage provided the register word that includes an indication (e.g., binary '1') of open pin. The usage of TMON and CFP pin can allow controller 102 to detect open pin conditions without a need to add additional pins to controller 102 and/or power stages 104. Process 700 then continues from block 724 back to block 716 for manual debugging.

Figure 8:
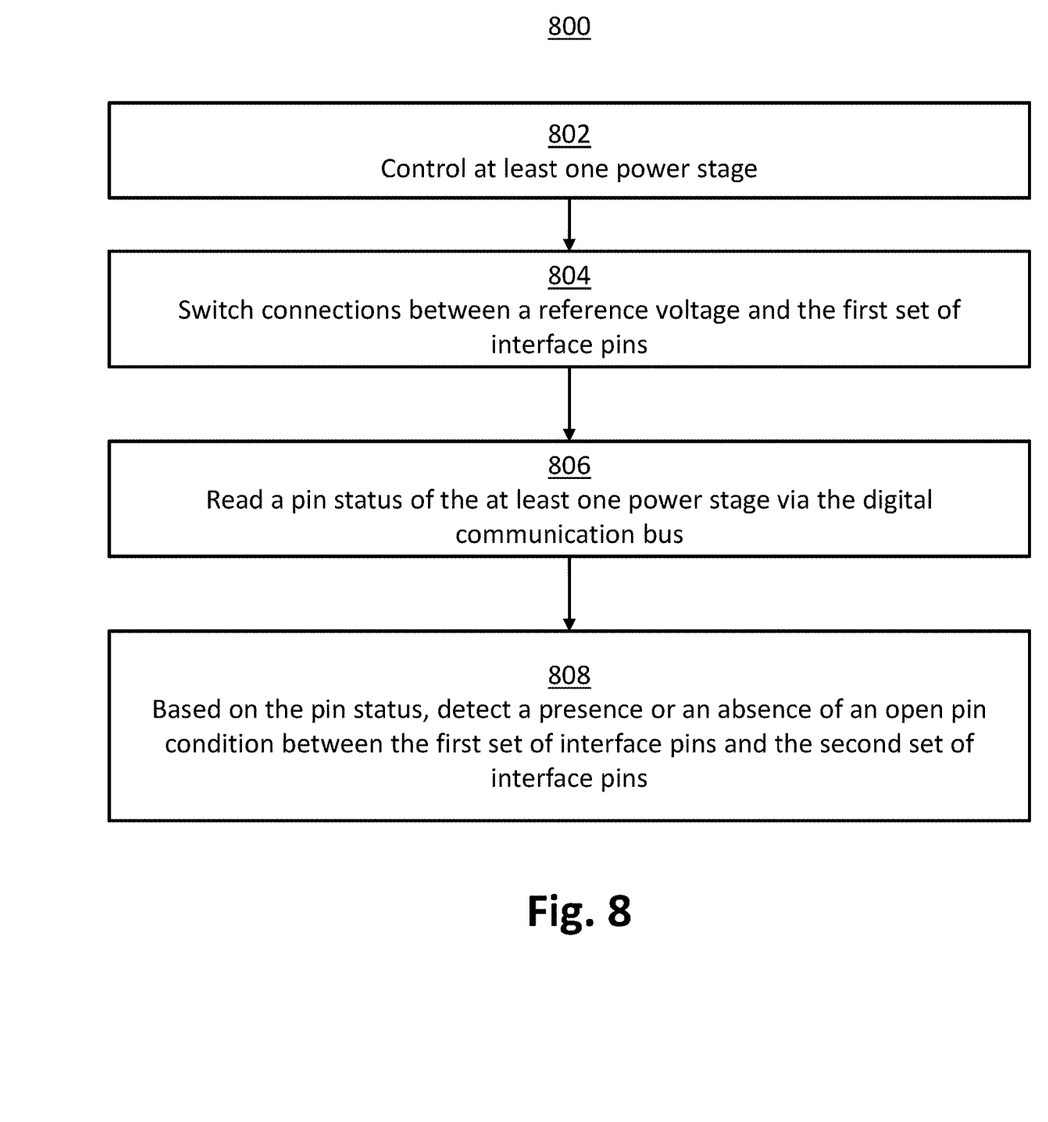
FIG. 8 is a flow diagram illustrating another process to implement digital open pin detection in one embodiment.

FIG. 8 is a flow diagram illustrating another process to implement digital open pin detection in one embodiment. A process 800 can include one or more operations, actions, or functions as illustrated by one or more of blocks 802, 804, 806 and/or 808. Although illustrated as discrete blocks, various blocks can be divided into additional blocks, combined into fewer blocks, eliminated, performed in different order, or performed in parallel, depending on the desired implementation.

Process 800 can be performed by, for example, a controller such as controller 102 described herein. Process 800 can begin at block 802. At block 802, the controller can be configured to control at least one power stage (e.g., power stages 104 described herein). The controller can include a first set of interface pins, a digital communication bus and a circuit. The circuit can be configured to switch connections between a reference voltage and the first set of interface pins. In one embodiment, the digital communication bus can be an Inter-Integrated Circuit (I2C) communication bus.

Process 800 can proceed from block 802 to block 804. At block 804, the controller can switch connections between a reference voltage and the first set of interface pins. In one embodiment, the controller can be configured to control the circuit to connect the reference voltage to a first interface pin among the first set of interface pins. The controller can wait for a lapse of a predefined amount of time. The controller can, in response to the lapse of the predefined amount of time, control the circuit to connect the reference voltage to a second interface pin among the first set of interface pins. In one embodiment, the controller can control the circuit to connect the reference voltage to all interface pins among the first set of interface pins.

In one embodiment, the controller can, in response to the lapse of the predefined amount of time, send a command to the at least one power stage via the digital communication bus to command the at least one power stage to switch connections of the second set of interface pins in the at least one power stage.

Process 800 can proceed from block 802 to block 806. At block 806, the controller can read a pin status of the at least one power stage via the digital communication bus. The pin status can indicate whether the reference voltage is detected at a second set of interface pins of the at least one power stage.

Process 800 can proceed from block 806 to block 808. At block 808, the controller can, based on the pin status, detect a presence or an absence of an open pin condition between the first set of interface pins and the second set of interface pins. In one embodiment, the controller can detect the presence of the open pin condition between the first set of interface pins and the second set of interface pins and set at least one interface pin among the first set of interface pins to a high voltage to indicate the presence of the open pin condition.

In one embodiment, the controller can control the circuit to switch connections between the reference voltage and the first set of interface pins prior to a startup of a system including the power stage. The controller can detect the presence of the open pin condition between the first set of interface pins and the second set of interface pins and stop the startup of the system in response to detection of the presence of the open pin condition.

In one embodiment, the controller can control the circuit to switch connections between the reference voltage and the first set of interface pins prior to a startup of a system including the power stage. The controller can detect the absence of the open pin condition between the first set of interface pins and the second set of interface pins and continue the startup of the system in response to detection of the absence of the open pin condition.

Figure 9:
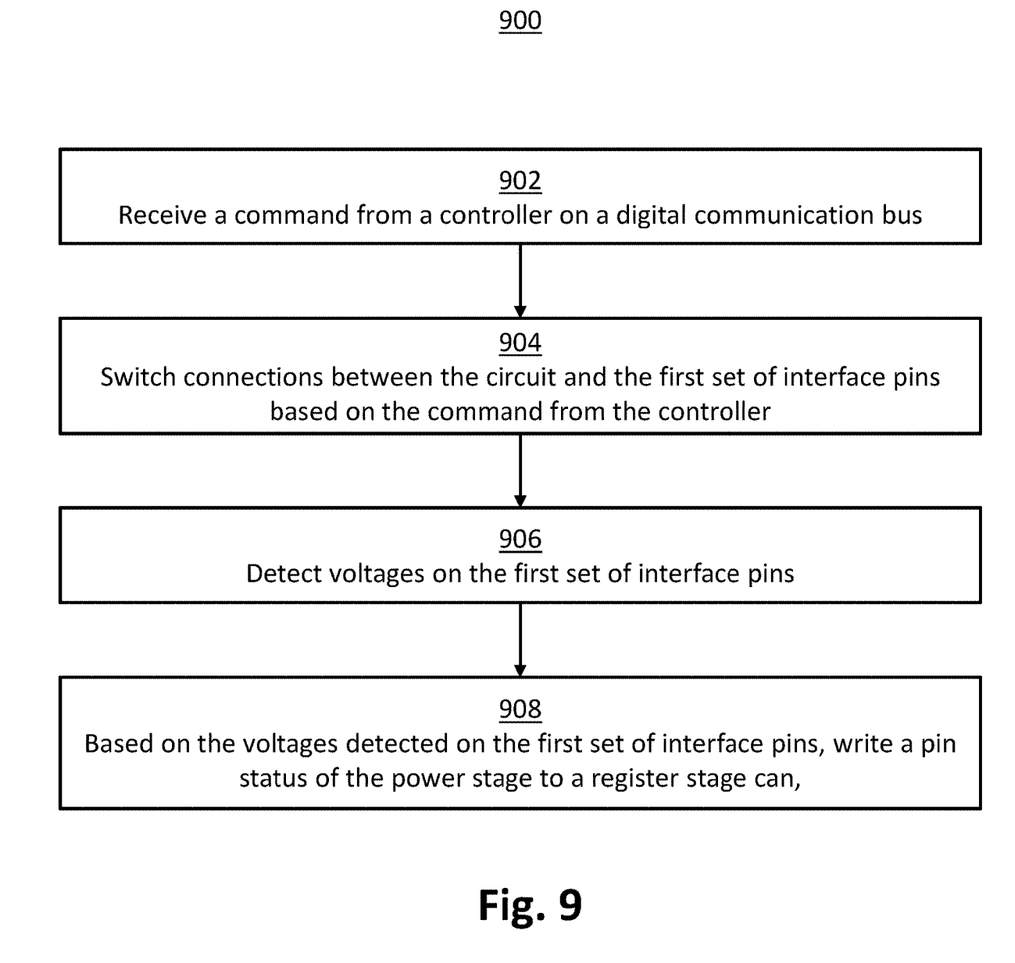
FIG. 9 is a flow diagram illustrating another process to implement digital open pin detection in one embodiment.

FIG. 9 is a flow diagram illustrating another process to implement digital open pin detection in one embodiment. A process 900 can include one or more operations, actions, or functions as illustrated by one or more of blocks 902, 904, 906, and/or 912. Although illustrated as discrete blocks, various blocks can be divided into additional blocks, combined into fewer blocks, eliminated, performed in different order, or performed in parallel, depending on the desired implementation.

Process 900 can be performed by, for example, a power stage such as anyone of power stages 104 described herein. Process 900 can begin at block 902. At block 902, the power stage can receive a command from a controller on the digital communication bus. The power stage can include a first set of interface pins, a digital communication bus, a switch and a circuit. The circuit can be configured to receive a command from a controller on the digital communication bus. The switch can be configured to switch connections between the circuit and the first set of interface pins based on the command from the controller. In one embodiment, the digital communication bus can be an Inter-Integrated Circuit (I2C) communication bus.

Process 900 can proceed from block 902 to block 904. At block 904, the power stage can switch connections between the circuit and the first set of interface pins based on the command from the controller. In one embodiment, the switch in the power stage can connect the circuit to a first interface pin among the first set of interface pins. The power stage can wait for a lapse of a predefined amount of time. The power stage can receive a new command to switch the connections between the circuit and the first set of interface pins and, in response to the lapse of the predefined amount of time, control the switch to connect the circuit to a second interface pin among the first set of interface pins.

Process 900 can proceed from block 904 to block 906. At block 906, the circuit in the power stage can detect voltages on the first set of interface pins. Process 900 can proceed from block 906 to block 908. At block 908, the circuit in the power based on the voltages detected on the first set of interface pins, write a pin status of the power stage to a register, wherein the pin status indicates whether a reference voltage is detected on at least one of the first set of interface pins.

In one embodiment, the circuit in the power stage can include a voltage window comparator configured to compare a voltage detected on the first set of interface pins with voltage window defined by the reference voltage. The circuit in the power stage can further include a NAND gate configured to write a binary zero to the pin status in the register when the voltage is within the voltage window and write a binary one to the pin status in the register when the voltage is outside of the voltage window.

In one embodiment, the circuit in the power stage can receive the command from the controller prior to a startup of a system including the power stage. The circuit in the power stage can receive a command to stop the startup when the reference voltage is not detected on at least one of the first set of interface pins. The circuit in the power stage can receive a command to continue the startup when the reference voltage is detected on all pins among the first set of interface pins.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An integrated circuit comprising:
a controller configured to control at least one power stage, wherein the controller comprises:
a first set of interface pins;
a digital communication bus,
wherein the controller is configured to:
send a command, via the digital communication bus, to control a circuit to sequentially switch connections between a reference voltage and the first set of interface pins;
read a pin status of the at least one power stage via the digital communication bus, wherein the pin status indicates whether the reference voltage is detected at a second set of interface pins of the at least one power stage; and
based on the pin status, detect a presence or an absence of an open pin condition between the first set of interface pins and the second set of interface pins.

2. The integrated circuit of claim 1, wherein the digital communication bus is an Inter-Integrated Circuit (I2C) communication bus.

3. The integrated circuit of claim 1, wherein the controller is configured to:
control the circuit to connect the reference voltage to a first interface pin among the first set of interface pins;
wait for a lapse of a predefined amount of time; and
in response to the lapse of the predefined amount of time, control the circuit to connect the reference voltage to a second interface pin among the first set of interface pins.

4. The integrated circuit of claim 3, wherein the controller is configured to:
in response to the lapse of the predefined amount of time, send a command to the at least one power stage via the digital communication bus to command the at least one power stage to switch connections of the second set of interface pins in the at least one power stage.

5. The integrated circuit of claim 1, wherein the controller is configured to control the circuit to connect the reference voltage to all interface pins among the first set of interface pins.

6. The integrated circuit of claim 1, wherein the controller is configured to:
detect the presence of the open pin condition between the first set of interface pins and the second set of interface pins; and
set at least one interface pin among the first set of interface pins to a high voltage to indicate the presence of the open pin condition.

7. The integrated circuit of claim 1, wherein the controller is configured to:
control the circuit to switch connections between the reference voltage and the first set of interface pins prior to a startup of a system including the power stage;
detect the presence of the open pin condition between the first set of interface pins and the second set of interface pins; and
stop the startup of the system in response to detection of the presence of the open pin condition.

8. The integrated circuit of claim 1, wherein the controller is configured to:
control the circuit to switch connections between the reference voltage and the first set of interface pins prior to a startup of a system including the power stage;
detect the absence of the open pin condition between the first set of interface pins and the second set of interface pins; and
continue the startup of the system in response to detection of the absence of the open pin condition.

9. An integrated circuit comprising:
a power stage configured to convert an input voltage into an output voltage;
a first set of interface pins;
a digital communication bus;
a circuit configured to receive a command from a controller on the digital communication bus; and
a switch configured to switch connections between the circuit and the first set of interface pins based on the command from the controller, wherein the circuit is further configured to:
    detect voltages on the first set of interface pins; and
    based on the voltages detected on the first set of interface pins, set a flag pin voltage and write a pin status of the power stage to a register, wherein the pin status indicates whether a reference voltage is detected on at least one of the first set of interface pins.

10. The integrated circuit of claim 9, wherein the digital communication bus is an Inter-Integrated Circuit (I2C) communication bus.

11. The integrated circuit of claim 9, wherein:
the switch is configured to connect the circuit to a first interface pin among the first set of interface pins;
wait for a lapse of a predefined amount of time;
receive a new command to switch the connections between the circuit and the first set of interface pins; and
in response to the lapse of the predefined amount of time, control the switch to connect the circuit to a second interface pin among the first set of interface pins.

12. The integrated circuit of claim 9, wherein the circuit comprises:
a voltage window comparator configured to compare a voltage detected on the first set of interface pins with voltage window defined by the reference voltage; and
a NAND gate configured to:
    write a binary zero to the pin status in the register when the voltage is within the voltage window; and
    write a binary one to the pin status and set the flag pin voltage high, in the register when the voltage is outside of the voltage window.

13. The integrated circuit of claim 9, wherein circuit is configured to:
receive the command from the controller prior to a startup of a system including the power stage;
receive a command to stop the startup when the reference voltage is not detected on at least one of the first set of interface pins; and
receive a command to continue the startup when the reference voltage is detected on all pins among the first set of interface pins.

14. A system comprising:
a power stage configured to convert an input voltage into an output voltage;
a controller configured to control the power stage; and
an external passive network connecting a first set of interface pins of the controller to a second set of interface pins of the power stage;
wherein the power stage is configured to:
    receive a command from a controller;
    sequentially switch connections among the second set of interface pins based on the command from the controller;
    detect voltages on the second set of interface pins; and
    based on the voltages detected on the second set of interface pins, set a flag pin voltage and write a pin status of the power stage to a register in the power stage, wherein the pin status indicates whether a reference voltage is detected at the second set of interface pins of the power stage, and
wherein the controller is configured to:
    switch connections between a voltage source and the first set of interface pins, wherein the voltage source is configured to generate the reference voltage;
    read the pin status of the power stage via a digital communication bus; and
    based on the pin status, detect a presence or an absence of an open pin condition in the external passive network.

15. The system of claim 14, wherein the digital communication bus is an Inter-Integrated Circuit (I2C) communication bus.

16. The system of claim 14, wherein the controller is configured to:
connect the reference voltage to a first interface pin among the first set of interface pins;
wait for a lapse of a predefined amount of time; and
in response to the lapse of the predefined amount of time, connect the reference voltage to a second interface pin among the first set of interface pins.

17. The system of claim 14, wherein the controller is configured to connect the reference voltage to all interface pins among the first set of interface pins.

18. The system of claim 14, wherein the controller is configured to:
switch connections between the reference voltage and the first set of interface pins prior to a startup of a system including the power stage;
detect the presence of the open pin condition between the first set of interface pins and the second set of interface pins; and
stop the startup of the system in response to detection of the presence of the open pin condition.

19. The system of claim 14, wherein the controller is configured to:
switch connections between the reference voltage and the first set of interface pins prior to a startup of a system including the power stage;
detect the absence of the open pin condition between the first set of interface pins and the second set of interface pins; and
continue the startup of the system in response to detection of the absence of the open pin condition.

20. The system of claim 14, wherein the power stage comprises:
a voltage window comparator configured to compare a voltage detected on the first set of interface pins with voltage window defined by the reference voltage; and
a NAND gate configured to:
    write a binary zero to the pin status in the register when the voltage is within the voltage window; and
    write a binary one to the pin status in the register and set the flag pin voltage high when the voltage is outside of the voltage window.

* * * * *